United States Patent [19]

Powers

[11] Patent Number: 4,662,536
[45] Date of Patent: May 5, 1987

[54] PAPER FILTER DISPENSER

[76] Inventor: Ernest G. Powers, P.O. Box 192, Clermont, Ga. 30527

[21] Appl. No.: 805,779

[22] Filed: Dec. 6, 1985

[51] Int. Cl.4 .......................... B65H 1/20; B65H 3/06
[52] U.S. Cl. ..................................... 221/43; 221/251; 221/259; 271/121
[58] Field of Search ............................. 221/36, 42–43, 221/231, 251, 259, 217–218; 271/121, 124

[56] References Cited

U.S. PATENT DOCUMENTS 4,269,324  5/1981  Hausam ........................... 221/259 X
4,339,057  7/1982  Winters ............................ 221/231 X

FOREIGN PATENT DOCUMENTS 57-13039  1/1982  Japan .................................. 271/121
58-52127  3/1983  Japan .................................. 271/124
58-63635  4/1983  Japan .................................. 271/121

Primary Examiner—Charles A. Marmor
Attorney, Agent, or Firm—Thomas & Kennedy

[57] ABSTRACT

A dispenser for sequentially dispensing filters has a band that passes in contact with a friction wheel. The band has relatively low frictional characteristics downstream from the wheel and where it contacts the wheel. The band has relatively high friction characteristics upstream of the wheel where a stack of filters may be stowed.

11 Claims, 4 Drawing Figures

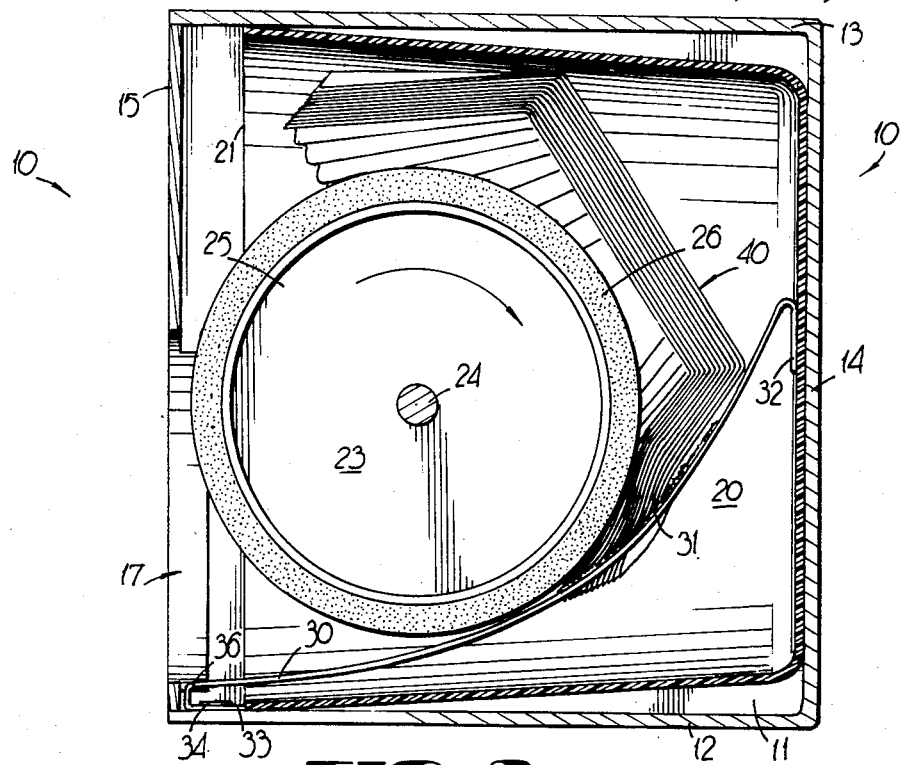
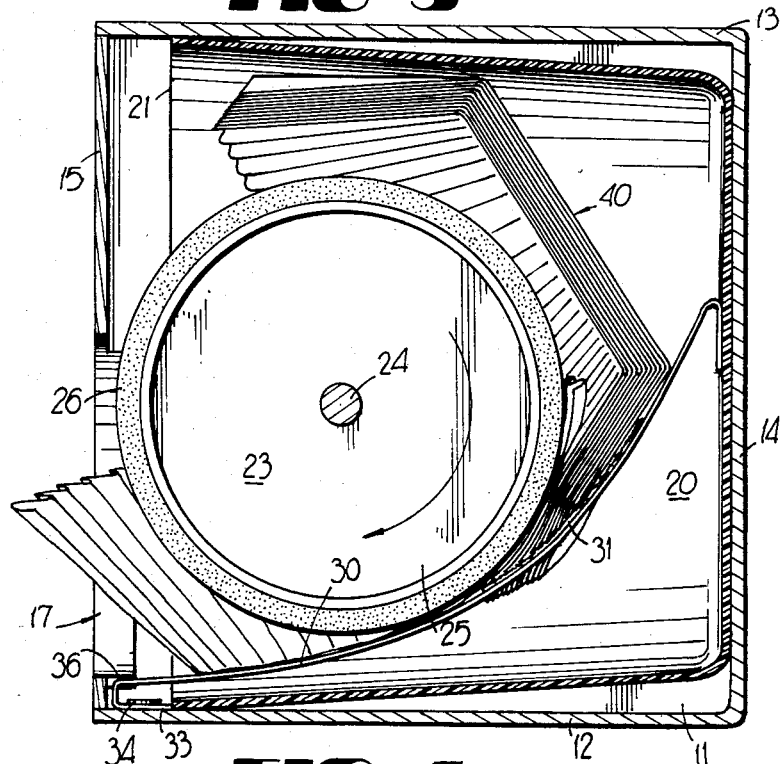

PAPER FILTER DISPENSER

TECHNICAL FIELD

This invention relates to dispensers for dispensing cup-shaped paper articles, such as coffee filters, food holder and the like, from a stack of the articles.

BACKGROUND OF THE INVENTION

Dispensers have heretofore been devised for sequentially dispensing filters individually from a stack as exemplified by those despensers shown in U.S. Pat. Nos. 4,269,324 and 4,339,057. The dispenser of the first mentioned patent comprises a storage compartment for holding a stack of inverted containers, and a dispensing arm or tongue that is rotatably driven by a hand crank so as to engage the member of the stack in proximity with the dispensing tongue and urge it off of the stack and out of the container. In the latter mentioned patent, a pin wheel is employed for releasibly gripping that member of a stack of filters in proximity with the wheel and for urging it off the stack and out of the dispenser.

Dispensers of the types just described have tended to be unreliable and unpredictable in operation. For example, they may remove one filter from a stack but then fail to pull it completely out of the dispenser. In other cases the filters tend to be ripped by the gripping elements employed. It all too frequently occurs that multiple filters are totally or partially dispensed simultaneously from the stack. In other cases it may take several operations of the dispensing mechanism before a member of the stack is properly dispensed. Worse still are those situations where the relatively fragile paper filters become crimped and jam the dispenser.

It thus is seen that a need remains for a dispenser for dispensing paper-like, cup-shaped containers, such as coffee filters, in a simple but consistent and reliable manner. It is to the provision of such a dispenser that the present invention is therefore primarily directed.

SUMMARY OF THE INVENTION

In one form of the invention a dispenser for sequentially dispensing filters from a stack of dish-shaped paper filters comprises a housing having an opening. A friction wheel is mounted for rotary movement within the housing and drive means provided for rotating the friction wheel. A band is mounted within the housing with a portion of the band in contact with the friction wheel. The band has a relatively low friction surface extending from adjacent the housing opening through the wheel contact portion, and a relatively high friction surface extending beyond the wheel contact portion on which a stack of filters may be set within the housing.

In another form of the invention, a dispenser for sequentially dispensing filters from a stack of dish-shaped paper filters comprises a friction wheel mounted for rotary movement and an elongated band mounted in radial alignment with the friction wheel with a central portion of the band being in contact with the wheel. An upstream portion of the band extends away from the wheel to form a wedge-shaped space in which a stack of dish-shaped filters may be positioned and stowed supported upon the band upstream feed portion in contact with the friction wheel while a downstream portion of the band extends away from the wheel.

BRIEF DESCRIPTION OF THE DRAWING

FIG. 3 is another side elevational view, in cross section, of the dispenser illustrated in FIG. 1 shown with a stack of coffee filters located in position for dispensing.

FIG. 4 is yet another side elevational view, in cross section, of the dispenser illustrated in FIG. 1 shown with a filter in the process of being dispensed out through an opening in the door of the dispenser.

DETAILED DESCRIPTION

Figure 1:
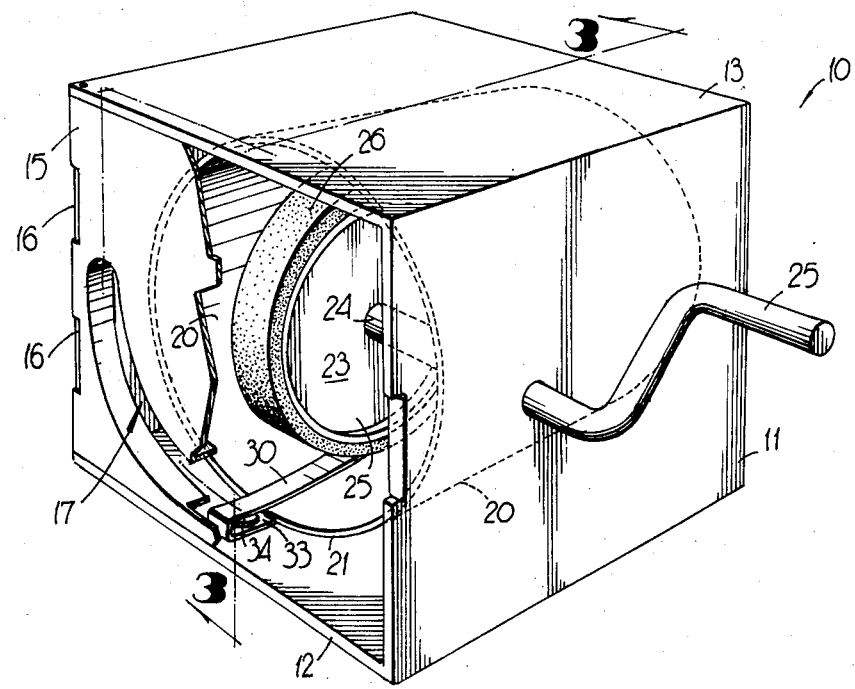
FIG. 1 is a perspective view of a dispenser embodying principles of the invention in one preferred form shown with a portion broken away to reveal internal components.

With reference next to the drawing there is shown a dispenser 10 which incorporates principles of the invention in a preferred form and which has a generally box-shaped housing comprised of two sides 11, a bottom or floor 12, a top 13, a back 14 and a front door 15 mounted for pivotable movement by a pair of hinges 16. The door is formed with a semi-circular slot 17 through which filters may sequentially exit the housing with the door closed. The location and configuration of the slot is such to provide the dispenser with an esthetically pleasing smile-like appearance.

With continued reference to the drawing the dispenser is further seen to include an interior wall 20 of a conical cup-shaped configuration having an annular lip 21 located adjacent the open front of the housing and space that the door occupies in its closed position. A friction wheel 23 is mounted for rotary movement within the inner wall 20. The wheel has an axle 24 that extends through two bearing holes formed in the two sides 11 that merge unitarily with a hand crank 25 located to the exterior of one of the housing sides 11. The annular periphery of the wheel is provided by a high friction rubber annulus 26 that has a substantially flat peripheral surface.

The dispenser is further seen to include a resilient metallic band 30, of somewhat smaller width than the annular wheel periphery, which has a strip of relatively high friction emory cloth 31 affixed as with adhesive to a portion of the upper surface of the band. A rear end 32 of the band is formed with a downturned end portion 32 while the front end of the band is formed with an inturned or reentrant end portion 33. The front end portion 33 of the band is fixedly secured by a fastener 34 to the housing floor 12 closely adjacent the closed position of the door 15. The rear end portion 32 of the band, on the other hand, is mounted in slidable, spring biased contact against the inside surface of the inner wall 20. The length of the band is such as to position a mid-portion of it in contact with the rubber annulus 26 of the friction wheel, as shown. The top end of the portion 36 of the band is at the elevation of the bottom lip of the slot 17, or slightly above it.

Figure 2:
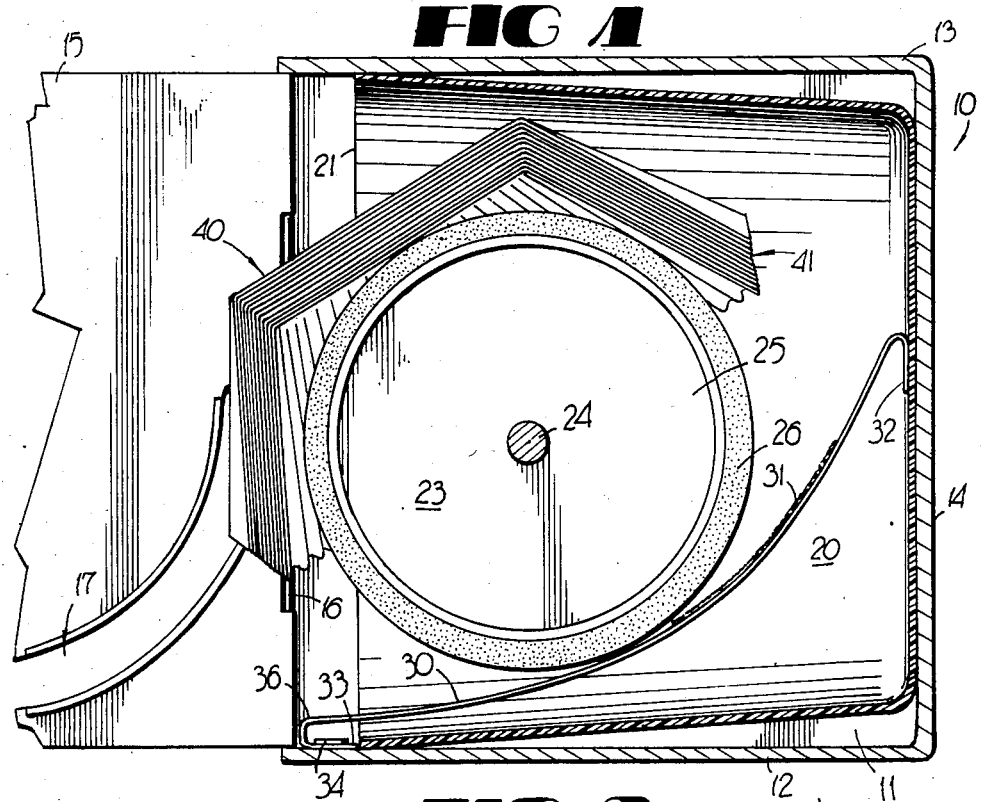
FIG. 2 is a side elevational view, in cross section, of the dispenser illustrated in FIG. 1 shown with its door open and with a stack of coffee filters being inserted into the dispenser.

For use the door of the dispenser is opened and a stack 40 of coffee filters or the like inserted into the dispenser over the top of the friction wheel, as shown in FIG. 2. The stack is continued to be inserted on about the wheel until edges 41 are positioned atop the strip of high friction emory cloth 31, as illustrated in FIGS. 3 and 4 within the wedge-shaped space provided by the wheel periphery and rear portion of the band. To dispense a filter the hand crank 25 is rotated whereupon the innermost member of the stack is urged off of the stack and between the area of substantial tangential contact of the band and wheel and then out of the dispenser. This may be done with the door 15 in an open position although normally it is done with the door closed such that the filters pass individually through the slot 17. After the dispensing of one of the filters, continued rotation of the crank will cause the next successive dispenser in the stack to be urged out of the device.

The just described dispenser has been found to work in an extremely reliable manner. By this is meant that operations of the hand crank predictably cause one dispenser at a time to be sequentially dispensed from the stack with neither significant overlap or gapping occurring. Such is believed to be attributable to the presence of the relatively high frictional area of the band 31 located behind the wheel upon which the edges 41 of the stack are positioned in the wedge shaped space in combination with the relatively low frictional area of the band that extends from the end of the emory cloth into contact with the wheel out to the exit of the dispenser. It is also believed to be attributable to the fact that the high friction area comes close to but does not actually make contact with the high friction wheel. Another factor is believed to be associated with the fact that the rear end of the band is not rigidly attached to the rear end of the inner wall but rather is allowed some sliding movement.

Though a hand crank has been shown in the illustrated embodiment, an electric motor may, of course, be substituted for the hand crank. Though coffee filters have been the product shown, the dispenser has been successfully used to dispense other paper-like, cup-shaped articles such as cupcake holders. Thus, articles like cupcake holders and the like are considered equivalents. Thus, the just described embodiment is intended merely to illustrate principles of the invention in one preferred form. Many modifications, additions and deletions may therefore be made, other than those expressly suggested, without departure from the spirit and scope of the invention as set forth in the following claims.

I claim:

1. A dispenser for sequentially dispensing filters from a stack of disc-shaped paper filters, and with the dispensing comprising a housing having an opening; a friction wheel mounted for rotary movement within said housing; drive means for rotating said friction wheel; and a band mounted within said housing with a portion of said band in contact with said friction wheel, said band having a relatively low friction surface extending from adjacent said housing opening through said wheel contact portion and a relatively high friction surface extending beyond said wheel contact portion on which a stack of filters may be set within said housing.

2. The dispenser of claim 1 wherein said drive means comprises a hand crank.

3. The dispenser of claim 1 wherein said housing has a generally cup shaped interior wall against which a stack of disc-shaped paper filters may be placed and set upon said band high friction surface.

4. The dispenser of claim 3 wherein one end of said band is mounted in slidable spring biased contact against said interior wall.

5. The dispenser of claim 1 wherein said band is mounted in substantially tangential contact with said friction wheel.

6. The dispenser of claim 1 wherein said band is resilient and biased into pressure contact with said friction wheel.

7. The dispenser of claim 1 wherein said band is metallic and has said high friction surface provided by an emory cloth band cover.

8. The dispenser of claim 1 wherein said friction wheel has a rubber peripheral surface.

9. The dispenser of claim 1 wherein said friction wheel has a substantially cylindrical peripheral surface.

10. The dispenser of claim 9 wherein said wheel peripheral surface is wider than said band contact portion.

11. A dispenser for sequentially dispensing filters from a stack of dish-shaped paper filters, and with the dispenser comprising a friction wheel mounted for rotary movement and an elongated band mounted in radial alignment with said friction wheel with a central portion of said band in contact with said friction wheel and an upstream portion extending away from said wheel thereby forming a wedge-shaped space in which a stack of dish-shaped filters may be positioned and stowed upon said band upstream feed portion in contact with said friction wheel, and a downstream portion extending away from said wheel, and wherein said central and downstream portions of said band have a relatively low friction surface adjacent said friction wheel and said upstream portion of said band has a relatively high friction surface adjacent said friction wheel.

* * * * *